(12) United States Patent
Sangle-Ferriere

(10) Patent No.: US 12,706,679 B2
(45) Date of Patent: Aug. 11, 2026

(54) SYSTEM FOR MAKING AVAILABLE AN EPR QUANTUM CHANNEL

(71) Applicant: Bruno Sangle-Ferriere, Paris (FR)

(72) Inventor: Bruno Sangle-Ferriere, Paris (FR)

( * ) Notice: Subject to any disclaimer, the term of this patent is extended or adjusted under 35 U.S.C. 154(b) by 205 days.

(21) Appl. No.: 18/882,179

(22) Filed: Sep. 11, 2024

(65) Prior Publication Data

US 2026/0095256 A1 Apr. 2, 2026

(51) Int. Cl.
*H04B 10/70* (2013.01)
*G06N 10/40* (2022.01)

(52) U.S. Cl.
CPC ............. *H04B 10/70* (2013.01); *G06N 10/40* (2022.01)

(58) Field of Classification Search
None
See application file for complete search history.

(56) References Cited

U.S. PATENT DOCUMENTS

| | | | | |
|---|---|---|---|---|
| 8,103,172 | B2 * | 1/2012 | Peters | H04L 9/0855 398/175 |
| 10,056,983 | B2 * | 8/2018 | Brandenburger | H04B 10/70 |
| 10,992,391 | B1 * | 4/2021 | Meyers | H04B 10/0799 |
| 11,641,242 | B1 * | 5/2023 | Bhaskar | G06N 10/20 398/130 |
| 12,574,122 | B2 * | 3/2026 | Bernardi | H04B 10/07955 |
| 2023/0058994 | A1 * | 2/2023 | Vacon | G06N 10/20 |

FOREIGN PATENT DOCUMENTS

FR 3125658 A1 1/2023

OTHER PUBLICATIONS

Manuel Brekenfeld et al. “A Quantum Network Node with Crossed Optical Fibre Cavities”, Arxiv. org, Cornell Library, 201 Olin Library Cornell University, Ithaca, NY 14853 (Apr. 19, 2020).

Dominik Niemietz et al. “Nondestructive detection of photonic qubits”, Nature, vol. 591, p. 570-574 Mar. 24, 2021(12 pages submitted total included extended data).

Dario Lago-Rivera et al. “Long distance multiplexed quantum teleportation from a telecom photon to a solid-state qubit” Nature Communications Vo. 14:1889, p. 1-6, Apr. 5, 2023.

(Continued)

*Primary Examiner* — Jai M Lee
(74) *Attorney, Agent, or Firm* — Jason A. Smith; Shumaker, Loop & Kendrick, LLP

(57) ABSTRACT

A system for making available an EPR quantum channel, including an entangled-photon emitter including a source configured to generate a pair of entangled photons, a first receiver and a second receiver each having:

a qubit storage unit designed to store the qubit carried by the received photon, a photon switch designed to send the received photon to said storage unit, a photon passage detector configured to control the photon switch and record the time of reception of the photon, an information processor designed to control the photon switch of said receiver, a communication system linking the two receivers together, designed to communicate the times of reception of the photons, in order to determine the pairs of entangled photons whose two photons have each reached the receiver to which they were sent.

17 Claims, 7 Drawing Sheets

(56) References Cited

OTHER PUBLICATIONS

Shashi Prabhakar et al. "Two-photon quantum interference and entanglement at 2.1 um", Sci. Adv., vol. 6, p. 1-7, Mar. 27, 2020.
Wang, R. (2005), Superluminal telecommunication: an observable contradiction between quantum entanglement and relativistic causality, arXiv: Quantum Physics.
Hannegan et al., "Entanglement between a trapped-ion qubit and a 780-nm photon via quantum frequency conversion", Phys., Rev. A vol. 106, dated Oct. 26, 2022 (11 pages).
Bernhard et al., "Shaping frequency entangled qudits", Physical Review A, arXiv:1303.6202v1, dated Mar. 25, 2013 (17 pages).
Hacker et al., "A photon-photon quantum gate based on a single atom in an optical resonator", published by the Max Planck Institute, arXiv:1605.05261v2 dated Feb. 16, 2017 (7 pages).
Duan et al., "Scalable Photonic Quantum Computation through Cavity-Assisted Interactions", Physical Review Letters, vol. 92, No. 12, dated Mar. 26, 2024 (4 pages).

* cited by examiner

SYSTEM FOR MAKING AVAILABLE AN EPR QUANTUM CHANNEL

TECHNICAL FIELD

The present invention relates to quantum communication methods, and more particularly to those allowing the teleportation of quantum information.

BACKGROUND

Long-distance information transmission is currently reserved for conventional information and not for quantum information, referred to as qubits (or sometimes qubits).

However, transmitting qubits over large distances would make it possible to link quantum computers together. This would for example allow relatively low-power computers to have their computations performed by more powerful computers, while still preserving the confidentiality of the data that are transmitted and computed. This would also make it possible to benefit from a network of quantum computers so as to overcome the low longevity of quantum memories, which is often of the order of a second, by working at the same time so as to jointly populate a quantum database that, grouped in a central computer, could be interrogated.

Over short distances, quantum teleportation would make it possible to implement quantum computers allowing for example the transfer of qubits and the control of the transfer of qubits to units for carrying out quantum operations.

In the context of quantum cryptography, it is known to use a pair of entangled photons to generate and transmit a code securely.

Entangled photons are photons in which the quantum state of one of the photons of the pair, for example its polarization, depends on the quantum state of the other photon of the pair, regardless of the distance between them. The phenomenon of quantum entanglement has been observed and demonstrated experimentally many times, such as for example in the Article by Shashi Prabhakar et al., *Two-photon quantum interference and entanglement at* 2.1 μm, Sci. Adv. 6, eaay 5195 (2020).

The Article by Wang, R. (2005), *Superluminal telecommunication: an observable contradiction between quantum entanglement and relativistic causality*, arXiv: Quantum Physics, describes a quantum communication system allowing superluminal information transmission using a pair of entangled photons sent to two receivers wishing to communicate with one another. The photons are entangled, and a linear polarization is measured for the photon arriving at the first receiver in different directions at 45° from one another. At the second receiver, the second photon is multiplied and the average polarization of the multiplied flux is measured in order to determine the direction of the measured polarization of the first photon. However, this system does not make it possible to transfer quantum states.

The polarization of a photon is not necessarily binary like that of a spin, or even quaternary. In particular, it may be represented on the Jones sphere, which characterizes the orientation and the ellipse of polarization: indeed, a polarization may be linear, the electric field always being parallel to an axis perpendicular to the direction of propagation of the photon, or circular, the electric field rotating about this axis, or between the two: the electric field taking an ellipse about the propagation axis. In the case where polarization is not circular, orientation measures the direction of this axis, and eccentricity measures the flattening of the ellipse. Patent FR3125658 exploits this property and makes it possible to transfer non-quantum information at speeds close to the speed of light, over large distances, for example more than 200 km, using optical fibers or free-space photon transmissions.

There are also some quantum information teleportation systems, such as for example the system for the teleportation of a qubit between a photon and an atom of matter described in the Article *Long distance multiplexed quantum teleportation from a telecom photon to a solid-state qubit*, Nature communications (2023). However, these systems are limited to short distances and teleportation is not carried out between two atoms of matter, but between a photon carried by an optical fiber and a photon stored in a crystal.

In addition, existing quantum information teleportation systems are limited by photon losses experienced during transport of said photons and are limited in terms of transmission speed by the transmission speed of the photons.

Finally, the article *Nondestructive detection of photonic qubits*, Journal Nature (2021), discloses a photon detection method that does not destroy the detected photon, but this article does not describe use thereof to allow the teleportation of qubits.

SUMMARY OF THE INVENTION

There is a need to further improve quantum communication systems and methods, in particular those for making available an EPR (Einstein-Podolski-Rosen) quantum channel to users up to several hundred kilometers apart, if optical fibers are used, or even more, in particular if free-space optical links are used.

The invention aims to address this need, and does so, according to a first of its aspects, by virtue of a system for making available an EPR quantum channel, comprising:

- an entangled-photon emitter comprising a source configured to generate at least one pair of entangled photons comprising a first photon emitted on a first propagation path and, preferably simultaneously, a second photon emitted on a second propagation path different from the first propagation path,
- a first receiver positioned on the first propagation path, comprising:
  - at least one qubit storage unit designed to store the qubit carried by the photon received by the first receiver,
  - a photon switch designed to send the photon received by the first receiver to said storage unit, or optionally to another channel that may lead to a storage unit or a photon evacuation channel,
  - a photon passage detector configured to control the photon switch and record the time of reception of the photon by the first receiver, and optionally the identifier of said storage unit to which the photon is sent where applicable,
- a second receiver positioned on the second propagation path so as to be reached by the second photon, said second receiver comprising:
  - at least one qubit storage unit designed to store the qubit carried by the photon received by the second receiver,
  - a photon switch designed to send the photon received by the second receiver to said storage unit, or optionally to another channel that may lead to a storage unit or a photon evacuation channel,
  - a photon passage detector configured to control the photon switch and record the time of reception of the photon by the second receiver, and optionally the identifier of said storage unit to which the photon is sent where applicable, at least one information processor contained in the first and/or second receiver, for example an electronic microprocessor, designed to control the photon switch of said receiver, a communication system linking the two receivers together, said communication system being designed in particular to communicate, to said information processor, the times of reception of the photons at the first and second receiver, in order to determine the pairs of entangled photons whose two photons have each reached the receiver to which they were sent.

The system for making available an EPR quantum channel according to the invention makes it possible to transmit information over long distances, in particular distances greater than 100 km, for example distances between 100 km and 400 km using optical fibers, or more, in particular using free-space optical communications.

Since the distance between the receivers and the emitter is very large, photon losses during transmission are high. In optical fibers, photon losses are around 0.2 dB/km. The qubit storage units of the two receivers make it possible to store only qubits that have been carried by the photons received by a first receiver for a waiting period, the waiting period corresponding to the period necessary to ascertain whether the qubit carried by the photon entangled with said photon has been received by the other receiver and stored there, plus a period during which said first receiver makes said qubit received at the first receiver available to the user.

The system according to the invention thus makes it possible to transmit information comprising a minimized error rate, the majority of the sources of error being eliminated.

This system may enable the transmission of quantum information with a latency time independent of the distance between the two locations wishing to communicate, and using only photons, thereby requiring only a small amount of energy.

The system is used for example in quantum communication networks and/or computer networks on Earth, in the sky and/or in space, in particular to communicate with systems far from the Earth, such as satellites or spacecraft.

The first and/or second receiver may comprise at least one additional channel, in particular downstream of the switch, which may lead to a storage unit or a photon evacuation channel.

Each of the receivers preferably has at least one interface, for example an electronic interface, allowing it in particular to communicate with the outside world and/or allowing it to display the presence, in one of its qubit storage units, of a qubit entangled with a qubit carried by a storage unit of the other receiver.

Photon Storage Unit

A storage unit of the first and/or second receiver may be chosen from among optical paths, in particular optical fibers or free-space passages formed using mirrors, or physical qubit vectors, in particular ions interacting indirectly with incident photons.

A photon storage unit of the first and/or second receiver may be located upstream of the photon switch of the first and/or second receiver, respectively. One or more photon storage units of the first and/or second receiver may be located downstream of the photon switch of the first and/or second receiver, respectively.

At least one storage unit may be an optical fiber, the photon received in the optical fiber being stored there for the time it takes it to travel through said optical fiber. The length of the optical fiber is preferably small enough for there to be little photon loss inside it, in particular less than 1% photon loss, and large enough to be able to store the photon for a period that allows a first receiver to determine whether the other receiver has received the entangled photon. The length of the optical fiber may be between 0.2 m and 500 m. The length of the fiber is for example substantially equal to 200 m, thereby making it possible to store the photon for around 1 microsecond.

A storage unit of the first and/or second receiver may be a physical qubit vector, for example an atom, in particular located in an optical cavity. A physical qubit vector may be physically displaced so as to be replaced by another physical qubit vector, preferably initialized before or after it has been displaced to an eigenstate allowing it to interact with a new incident photon. A physical qubit vector may be stimulated so as to emit a photon with which it is entangled before being reset so as to be ready to interact with a new photon coming from the entangled-photon emitter, said photon with which it is entangled interacting in particular with the control port of a CNOT gate. Said displacement or said stimulation of the physical qubit vector is advantageously controlled by an external device.

A storage unit of the first and/or second receiver is preferably designed to be made available to store a new qubit, at the request of one of the information processors, or periodically, in particular if the qubit storage unit requires manipulation in order to be able to store a new qubit.

If the qubit storage unit makes it possible to detect the reception of a photon, said qubit storage unit may also make it possible to detect the passage of photons.

The duration for which each storage unit is capable of storing a qubit is preferably greater than the time offset between the arrivals of the two entangled photons at the two receivers plus the time taken by the communication system to communicate information about the arrival times of the entangled photons, the time needed for the processors to decide whether two entangled qubits are present in one of the storage units of the receivers, and the time taken by the processors to inform the interfaces thereof.

The communication system may be designed to communicate the information faster than the speed at which the photons are transported in the optical fiber. This may make it possible to reduce the number of storage units needed to store each of the qubits carried by the photons for one and the same reception rate of said photons. This may also make it possible to reduce the duration for which a qubit is stored in a storage unit. This may therefore make it possible to use optical fibers as storage units, and/or to increase the fidelity of the stored qubits.

The system for making available an EPR quantum channel may comprise a single qubit storage unit per receiver.

Each qubit storage unit may have an identifier.

Photon Switch

The photon switch of the first receiver and/or second receiver may be an optical switch.

The photon switch of the first receiver and/or second receiver may comprise a mirror the direction of the axis of which may be mechanically slaved to a sensor or to an electrically controlled device or, alternatively, comprise a prism or a plate made of a material whose refractive index depends on an electric field: a Pockels cell, or a transparent material with a non-linear refractive index, another luminous flux, for example a transverse luminous flux preferably having a wavelength different from that of the photon and unable to generate photons of the same wavelength as that of the photon, varying the refractive index of said non-linear material and thus controlling the location and possibly the exit direction of the photon from said material.

The photon switch of the first receiver and/or second receiver may be an optical microresonator, that is to say a cavity formed of an optical medium surrounded by reflective surfaces, in particular configured to serve as an optical CNOT gate as described below, into which atoms that are to interact with each photon are successively introduced. At least two holes may be formed in the cavity so as to let through at least two light rays serving as optical tweezers and allowing the atom to be introduced into and positioned within the cavity. The use of optical tweezers in particular allows an atom to be displaced after it has interacted with the first of two photons to perform a CNOT operation. The atom may in particular be displaced to another cavity and replaced by a new atom, this making it possible to receive a new photon carrying a qubit used as a control qubit of another CNOT gate.

Photons enter and exit the microresonator in particular by virtue of optical fibers the end of which is cut into a lens shape.

As a variant, the photon switch of the first receiver and/or second receiver is an acousto-optic deflector. The acousto-optic deflector may comprise an acousto-optic material belonging in particular to the group consisting of: quartz glass, lithium niobate, diarsenic trisulfide, tellurium dioxide, more generally tellurium glasses, flint glass, calomel, lead (II) bromide. As a variant, the acousto-optic material is water. The acousto-optic deflector may comprise electro-acoustic transducers, in particular piezoelectric materials. The acousto-optic deflector has its refractive index varied according to the sound wave propagating in the deflector. The direction of transmission of the photon by the acousto-optic deflector depends on the refractive index of the deflector, and therefore on the sound wave propagating inside it. The acousto-optic deflector therefore makes it possible to send the photon to a predefined storage unit, by virtue of a suitable sound wave.

The photon switch of the first receiver and/or second receiver advantageously has the ability to direct a received photon to a photon absorber.

Photon Passage Detector

The photon passage detector of the first and/or second receiver may comprise a non-destructive photonic qubit detector, for example using parametric conversion of the incoming photon, which produces two photons of smaller frequencies from a single photon, where one of the photons produced announces the presence of a qubit and the other provides information about said qubit, or, alternatively, a photon detector as described in the article by Niemietz, D., Farrera, P., Langenfeld, S. et al., *Nondestructive detection of qubitsic qubits*, Nature 591, 570-574 (2021). The non-destructive photonic qubit detector makes it possible to detect the passage of the photon without absorbing it, therefore without destroying its properties.

The non-destructive photonic qubit detector may comprise a QED cavity in which a rubidium atom is trapped. This atom has two energy levels of interest defining observable values, and is placed in a state of quantum superposition of these two values. When the photon is reflected by the cavity, it is able to modify the state of quantum superposition of the atom by subjecting it to a Pauli-Z gate, and therefore leaves a measurable trace. This change of state may be detected by applying a microwave pulse that rotates the quantum state by Pi/2 so as to put it either in the observable state 1, if no Pauli-Z gate has been applied, or in the state 0, if a Pauli-Z gate has been applied. By measuring the change of state of the atom, it is then possible to detect the passage of a photon without destroying it, the application of electromagnetic microwave pulses making it possible to return the atom to its initial state of superposition after the change of its state of superposition has been detected.

As a variant, the photon passage detector of the first and/or second receiver may comprise a device as described in the article by Brekenfeld, M., Niemietz, D., Christesen, J. D. et al. A quantum network node with crossed optical fibre cavities. *Nat. Phys.* 16, 647-651 (2020), the device storing the qubit transported by a photon incident on an atom of matter and allowing said storage to be detected.

The photon passage detector of the first receiver and the photon passage detector of the second receiver may each comprise a clock, the two clocks being synchronized with one another. The photon passage detectors of the first and second receivers may thus record the time of reception of the photons by the first receiver and the second receiver, respectively.

Preferably, the clocks of the two receivers are configured to take into account the phenomenon of the different passage of time at various locations, in particular the various altitudes of each of the components.

The temporal accuracy of a photon detector may be improved by using multiple photon detectors to which the arriving photons are successively directed using one photon switch, another photon switch advantageously making it possible to return the photons that have traveled through the various photon detectors on one and the same optical path. A clock may for example control these switches so as to change the photon detector that is used at regular time intervals.

If for example the temporal accuracy of the photon detector is t1, t1 corresponding to the reciprocal of its operating frequency, that is to say for example the frequency of verification of the quantum state of the atom in the case of a cavity detector as described above, and if the required temporal accuracy is t2 less than t1, it is possible to use t1/t2 photon detectors (or its upper integer) and to direct the photons to a different photon detector every t2. This makes it possible to give the photon detector the time t1 to detect or not detect the passage of a photon. After the time t1, with a photon possibly having been detected, the quantum state of the photon detector may be reset to allow the detection of a new photon.

Information Processor

The two receivers may each comprise at least one information processor.

The or one of the information processors, having identified a pair of photons the two entangled photons of which have each reached a receiver, may inform the interfaces of each of the receivers about the identifiers of the storage units storing the qubits carried by said entangled photons.

The or one of the information processors, having identified a pair of entangled photons at least one of the photons of which has not reached one of the two receivers, may make available the storage unit in which the qubit carried by the other photon has been stored for the storage of a new qubit and, if necessary, may command the operation for making it available.

The one or more information processors may command the receiver furthest from the photon emitter to direct the photon whose entangled photon has not been received by the other receiver to a photon absorber.

Communication Unit

The photon passage detector of the first receiver may comprise a communication unit and the photon passage detector of the second receiver may comprise a communication unit, the two communication units preferably communicating with one another via the communication system. Exchanging the times of reception of the photons allows each of the receivers that has received a first photon to determine whether the other receiver has received the photon entangled with this first photon.

The communication system advantageously makes it possible to transmit information between each of the receivers faster than the speed of travel of the photons between the emitter and each of the receivers. The quantum communication system is for example the one described in patent FR3125658. As a variant, the communication system is an optical communication system, in particular an optical fiber communication system, a radio communication system, or a power line communication system.

A high speed of the communication system makes it possible to reduce the number of storage units of the receiver. In particular, if the time taken by the two receivers to communicate through the communication system, plus the time taken to control the switches, is less than the time between the arrival of two photons at each of the receivers, the number of qubit storage units may be reduced to one, the storage unit then being located upstream of the photon switch, forming the link between the photon passage detector and the photon switch.

If the information communication system does not make it possible to transmit information between each of the receivers faster than the speed of travel of the photons between the emitter and each of the receivers, the system for making available an EPR quantum channel comprises at least two qubit storage units per receiver.

The travel time of the photon in said photon storage unit may be extended, in particular by using a storage unit with a high refractive index, or with a length greater than the distance between the photon passage detector and the photon switch.

The communication units advantageously comprise means for exchanging conventional information between the two receivers, allowing them in particular to exchange the conventional bits needed to implement quantum teleportation.

Control Unit

The photon passage detector of the first receiver may comprise a control unit, in particular configured to control the photon switch of the first receiver.

The photon passage detector of the second receiver may comprise a control unit, in particular configured to control the photon switch of the second receiver.

The control unit of the first and/or second receiver may comprise the one or more information processors.

For example, the control unit is configured to control the current sent to the electroacoustic transducers of the photon switch, in order to modify the refractive index of the acousto-optic material and thus the direction of transmission of the photon.

The control unit of the first receiver may be configured to command the photon switch of the first receiver to send the photon to a first qubit vector outside the system, if the photon passage detector of the first receiver receives information that the second receiver has received the photon entangled with said photon.

The control unit of the first receiver may be configured to command the photon switch of the first receiver to send the photon to a photon evacuation channel of the first receiver, if the photon passage detector of the first receiver receives information that the second receiver has not received the photon entangled with said photon.

The control unit of the second receiver may be configured to command the photon switch of the second receiver to send the photon to a second qubit vector outside the system, if the photon passage detector of the second receiver receives information that the first receiver has received the photon entangled with said photon.

The control unit of the second receiver may be configured to command the photon switch of the second receiver to send the photon to a photon evacuation channel of the second receiver, if the photon passage detector of the second receiver receives information that the first receiver has not received the photon entangled with said photon.

Anti-Reflection Layers

To avoid photon loss, anti-reflection layers are preferably positioned at the interfaces between the adjacent transparent media of different index that are passed through by the photons, and at the interfaces of the prisms and birefringent plates that are passed through by photons, the anti-reflection layer preferably being matched to the one or more indices of the material and to the one or more angles of incidence and directions of polarization and to the wavelength of the photon that is to pass through it.

Dichroic Filters

The first and/or second receiver preferably comprises one or more dichroic filters that let through only photons of a given wavelength, in particular a prism made of a dispersive transparent material, in particular if the non-linear refractive indices of the materials are modified by the application of powerful luminous fluxes.

Methods for Making Available an EPR Quantum Channel

Another subject of the invention is a method for making available an EPR quantum channel using the system for making available an EPR quantum channel defined above, comprising the following steps:

(a) generating a pair of entangled photons from an emitter, the first photon of the pair being emitted to a first receiver and the second photon of the pair being emitted, preferably simultaneously, to a second receiver, the first and second photons being entangled, (b) detecting, where applicable, the arrival of a photon by way of a photon passage detector at each of the receivers, (c) communicating the times of reception of the photons between the two photon passage detectors of the first and second receivers, If the communication between the two photon passage detectors is faster than the time taken by the photon received by said receiver to travel from the photon passage detector to the photon switch of this receiver, the method comprises:

(d) a single temporary storage unit of the receiver conveying the photon from the photon passage detector to the photon switch, If the photon passage detector that received the photon receives information that the other photon passage detector has received the photon entangled with said photon, the method comprises:

(d1) the photon switch sending the photon to a qubit vector outside the system,

If the photon passage detector that received the photon receives information that the other photon passage detector has not received the photon entangled with said photon, the method comprises:

(d2) the photon switch sending the photon to a photon evacuation channel,

If the communication between the two photon passage detectors is slower than the time taken by the photon received by said receiver to travel from the photon passage detector to the photon switch of this receiver, the method comprises:

(e) conveying the photon from the photon passage detector to the photon switch and the photon switch sending the photon to a qubit storage unit, If the photon passage detector that received the photon receives information that the other photon passage detector has received the photon entangled with said photon, the method comprises:

(e1) the switch sending the photon from the qubit storage unit to a qubit vector outside the system if the qubit storage unit is an optical device or, if the qubit storage unit is not an optical device, making the qubit contained in the qubit storage unit available to a user, said availability for example being announced to the user by the electronics of the receiver, If the photon passage detector that received the photon receives information that the other photon passage detector has not received the photon entangled with said photon, the method comprises:

(e2) the photon switch sending the photon from the optical qubit storage unit to a photon evacuation channel, or if the qubit storage unit is not an optical device, resetting the qubit storage unit so that it is ready to receive a new photon.

Transmission of Multiple Photons

The photons may be counted when they arrive at a photon passage detector. If the count reveals the arrival of more than one photon during a predefined time interval, at least some of these photons may be transmitted, during this time interval, to the photon evacuation channel.

Quantum Information Teleportation Assembly

Another subject of the invention, according to another of its aspects, is a quantum information teleportation assembly comprising at least two systems for making available EPR quantum channels as described above, chained one after the other, and comprising in particular at least one optical CNOT gate between each of the systems.

The assembly may comprise between 1 and 10 systems for making available EPR quantum channels as described above, chained one after the other.

The assembly may comprise between 1 and 30 systems for making available EPR quantum channels as described above, chained one after the other, if said systems benefit from an error correction system.

The systems for making available EPR quantum channels of the chain are preferably chained one after the other by identical devices operating using the same process.

A first photon exiting a first system for making available EPR quantum channels of the assembly is advantageously sent to the control port of said CNOT gate. A second photon exiting a second system for making available EPR quantum channels of the assembly, following the first system, is advantageously sent to the controlled port of said CNOT gate.

The assembly may comprise one or more devices designed to perform a Bell measurement on the first and second photons at the output of said CNOT gate, the first photon passing through a Hadamard gate at the output of the CNOT gate before its Bell measurement is performed. The results of this measurement are preferably sent, in particular using the communication units associated with the two systems for making available EPR quantum channels, to a set of unitary quantum gates at the output of the last system for making available EPR quantum channels of the chain.

The set of unitary quantum gates at the output of the last system of the chain is preferably formed of linear optical systems that make it possible to apply, to the photon exiting the last system of the chain, either no modification, that is to say a NOT gate, or a succession of combinations of gates, in particular a NOT gate followed by a Pauli-Z gate.

The photon exiting the receiver of the last system for making available EPR quantum channels of the chain, said receiver not being connected to any other receiver of another system, is advantageously sent to a unitary gate, the unitary gate being the product of the unitary quantum gates obtained by each of the Bell measurements at the interface of each of the chained systems for making available EPR quantum channels.

The unitary quantum gates are in particular:

If $D_1=0$ and $D_2=0$, the unitary quantum gate is identity,

If $D_1=0$ and $D_2=1$, the unitary quantum gate is a Pauli-Z gate,

If $D_1=1$ and $D_2=0$, the unitary quantum gate is a NOT gate,

If $D_1=1$ and $D_2=1$, the unitary quantum gate is a NOT gate followed by a Pauli-Z gate, $D_1$ being the measurement of the quantum state of the first photon exiting the CNOT gate via the port associated with the control photon and $D_2$ being the measurement of the quantum state of the second photon exiting the CNOT gate via the port associated with the controlled photon, the measurement D of the quantum state of a photon being for example 1 if it is measured with a vertical polarization and 0 with a horizontal polarization.

CNOT Gate

The CNOT gate may comprise a cavity in which a neutral atom, in particular a rubidium atom, is trapped.

The first photon, which is what is referred to as the control photon, may in particular be linearly polarized when it enters the CNOT gate.

The second photon, which is what is referred to as the controlled photon, is preferably linearly polarized when it enters the CNOT gate. The second photon possibly passing through the cavity possibly experiences a phase shift of Pi there. The CNOT gate advantageously comprises a first polarization converter that makes it possible for example to transform the polarization of the second photon into circular polarization, in one direction if the photon is horizontally polarized, or in the other direction if it is vertically polarized, before sending said photon to the cavity.

The CNOT gate may comprise an orientator designed to direct the first photon and the second photon to a polarizing filter.

The polarizing filter may be designed to send the first photon to a mirror, in particular if it is vertically polarized, or to a cavity containing a rubidium atom, in particular if it is horizontally polarized.

The polarizing filter is for example designed to send the second photon to the mirror if it is vertically polarized, or to the cavity containing the rubidium atom if it is horizontally polarized. An external device may apply an electromagnetic pulse to the atom so that its quantum state changes by $\pi/2$.

The polarizing filter may also be designed to return the first photon and/or the second photon reflected by the mirror and/or the cavity to the orientator, in particular with the vertical component of the polarization of the second photon without a phase change and with the horizontal component phase-shifted by $\pi$, causing the circular polarization of the second photon to change direction. The orientator may also be designed to send the first photon to an output of the CNOT gate. The CNOT gate advantageously comprises a second polarization converter at the output of the orientator for converting the circular polarization of the second photon into linear polarization. The distances between the polarizing filter and the mirror and between the polarizing filter and the cavity may be adjusted such that the optical path of the first and second photons is the same when returning to the orientator regardless of where they are reflected, the mirror or the cavity.

The first and second polarization converters are for example quarter-wave plates matched to the wavelength of the second photon, or quarter-wave plates interposed between two outputs of two multiplexers associated with one and the same wavelength, and matched to said same wavelength. The orientator may consist of electrically controlled elements such as liquid crystals or Pockels cells, so as to be able to control the trajectory of the photons according to the date of their passage. The wavelengths of the two photons may be different. The orientator may comprise dichroic materials and/or filters.

Method for the Teleportation of Quantum Information

Another subject of the invention is a method for the teleportation of quantum information using a quantum information teleportation assembly as defined above, comprising transmitting a qubit from a first receiver to a second receiver, the first receiver being called the input receiver and the second receiver being called the output receiver.

The quantum information teleportation assembly advantageously assigns an identifier to each pair comprising the input photon, arriving at the input receiver, and the output qubit vector, at the output of the output receiver, and makes this identifier accessible to the user of said assembly, for example by writing it to a user-accessible memory.

The output receiver may have an indicator for signaling, to its one or more users, the availability of an output qubit vector linked to a photon arriving at the input receiver.

The input receiver advantageously has registers indicating, for each input photon whose entangled photon has been identified as having reached the other receiver of the input system, the estimated time of exit of said input photon from the input receiver, so that the user of the input receiver is able to prepare for possible manipulation thereof.

The input receiver also advantageously indicates the time available to the user to manipulate said input photon before its entangled photon interacts with an external physical qubit vector or exits said input receiver. The manipulation is for example the passage of the photon through a controlled NOT quantum logic gate (that is to say CNOT) or a Toffoli quantum logic gate.

If the output qubit vector is physical and able to be consulted, in particular by optical excitation, the output system advantageously places, in a memory able to be consulted by the user of the output receiver, the estimated time between the command to carry out optical reading of the output qubit vector and the arrival of the photon emitted by the output qubit vector after optical excitation thereof, the path taken by this photon possibly being different depending on the location of the physical qubit vector within the output receiver.

Teleportation

Teleportation may be carried out between first and second qubits separated by a system for making available EPR quantum channels as described above, or be carried out by a quantum information teleportation assembly as described above, the vectors of the first and second qubits in particular being able to be, respectively, a photon and a photon, a neutral rubidium$^{87}$ atom and a photon, a neutral rubidium$^{87}$ atom and another neutral rubidium$^{87}$ atom.

Method for the Long-distance Teleportation of a Qubit Carried by a Rubidium Atom to a Photon Another subject of the invention is a method for the long-distance teleportation of a qubit carried by a neutral atom, such as a rubidium atom, to a photon, using the above-described system for making available a quantum channel, comprising the following steps:

- generating a pair of entangled photons from an emitter, the first photon of the pair being emitted to a first receiver and the second photon of the pair being emitted, preferably simultaneously, to a second receiver, the first and second photons being entangled, the photons in particular having a wavelength of 780 nm, the first photon encoding a qubit, in particular according to a linear polarization base,
- sending the first photon received at the first receiver to a CNOT gate comprising a cavity in which the neutral atom is trapped, in particular as described above,
- sending electromagnetic-wave pulses in the microwave range to the neutral atom, thus subjecting it to a Hadamard gate,
- measuring the excitation state of the neutral atom and measuring the polarization of the first photon at the output of the CNOT gate,
- communicating said measurements to the second receiver,
- depending on the measurements of the states of the neutral atom and of the direction of the polarization of the first photon, that is to say the state 0 or 1 of the qubit carried by each of them, modifying the polarization of the second photon.

If the measurement of the qubit carried by the neutral atom is 0 and that of the qubit carried by the first photon is 0, that is to say for example if it has a vertical polarization, the second photon does not undergo any operation, for example.

If the measurement of the qubit carried by the neutral atom is 0 and that of the qubit carried by the first photon is 1, that is to say for example if it has a horizontal polarization, the second photon may be sent through a Pauli-Z gate.

If the measurement of the qubit carried by the neutral atom is 1 and that of the qubit carried by the first photon is 0, that is to say for example if it has a horizontal polarization, the second photon may be sent through a NOT gate.

If the measurement of the qubit carried by the neutral atom is 1 and that of the qubit carried by the first photon is 1, that is to say for example if it has a horizontal polarization, the second photon may be sent through a NOT gate followed by a Pauli-Z gate.

The NOT gate consists for example of two birefringent prisms and two half-wave plates.

The Pauli-Z gate consists for example of a half-wave plate.

Method for the Teleportation of a Qubit Carried by a First Neutral Atom to a Second Neutral Atom Another subject of the invention is a method for the long-distance teleportation of a qubit carried by a first neutral atom, such as a rubidium atom, to a second neutral atom, such as a rubidium atom, using the above-described system for making available a quantum channel, comprising the following steps:

- generating a pair of entangled photons from an emitter, the first photon of the pair being emitted to a first receiver and the second photon of the pair being emitted, preferably simultaneously, to a second receiver, the first and second photons being entangled, the photons in particular having a wavelength of 780 nm, the first photon encoding a qubit, in particular according to a linear polarization base, exciting the first neutral atom, located at the first receiver, until it emits a photon, and directing the emitted photon to the control port of a first CNOT control gate before sending it to a first Hadamard gate, sending the first photon of the pair of entangled photons to the controlled port of the first CNOT gate, measuring the direction of the polarization of the photon emitted by the first neutral atom at the output of the Hadamard gate and the direction of the polarization of the first photon at the output of the CNOT gate, communicating said measurements to the second receiver, depending on the measurements of the states of the neutral atom and of the direction of the polarization of the first photon, that is to say the state 0 or 1 of the qubit carried by each of them, modifying the polarization of the second photon of the pair of entangled photons to the second one, sending the modified second photon to the control port of a second CNOT gate before sending it to a second Hadamard gate, exciting the second neutral atom, located at the second receiver, until it emits a photon, and directing the emitted photon to the controlled port of the second CNOT gate, measuring the direction of the polarization of the photon emitted by the second neutral atom at the output of the second CNOT gate and the direction of the polarization of the second photon at the output of the second Hadamard gate, sending at least one microwave electromagnetic pulse to the second neutral atom so as to subject it to a unitary quantum gate, characterized in particular as follows:

- if the measurement of the direction of the polarization of the photon emitted by the second neutral atom is 0 and that of the polarization of the second photon is 0, the second neutral atom does not undergo any operation, for example,
- if the measurement of the direction of the polarization of the photon emitted by the second neutral atom is 1 and that of the polarization of the second photon is 0, the second neutral atom may be subjected to a Pauli-Z gate,
- if the measurement of the direction of the polarization of the photon emitted by the second neutral atom is 0 and that of the polarization of the second photon is 1, the second neutral atom may be subjected to a NOT gate,
- if the measurement of the direction of the polarization of the photon emitted by the second neutral atom is 1 and that of the polarization of the second photon is 1, the second neutral atom may be subjected to a NOT gate followed by a Pauli-Z gate.

As an alternative, the entangled photons emitted by the emitter are of a wavelength other than 780 nm and are converted to 780 nm photons, before they arrive at the photon receivers, by a frequency mixer, as described for example in the Article "Entanglement between a trapped ion qubit and a 780-nm photon via quantum frequency conversion" published on Oct. 26, 2022 in Physics review.

Method for the Teleportation of Qubits Carried by Physical Qubit Vectors, in Parallel, Allowing the Implementation of an Error Correction Algorithm During Qubit Transmission Using the Communication System Another subject of the invention is a method for the teleportation of qubits carried by physical qubit vectors, in parallel, allowing the implementation of an error correction algorithm during qubit transmission, the method using the above-described system for making available EPR quantum channels, the method comprising:

emitting pairs of entangled photons, the first photon of each pair being emitted to a first receiver and the second photon of each pair being emitted, preferably simultaneously, to a second receiver, each receiver containing at least one neutral atom, such as a rubidium atom, for example nine neutral atoms, the one or more neutral atoms being designed to be able to emit photons and be subjected to unitary quantum gates, each of the atoms of one receiver being paired with a neutral atom of the other receiver.

simultaneously, at each receiver, sending photons emitted by one of the neutral atoms of said receiver to a single photon passage detector of said receiver, the single photon passage detector being located upstream of a single CNOT gate of said receiver, until said neutral atom of said receiver has been entangled with the neutral atom with which it is paired in the other receiver, once each pair of neutral atoms has been entangled, applying an error reduction algorithm, for example Shor's algorithm.

BRIEF DESCRIPTION OF THE DRAWINGS

The invention may be understood better from reading the following detailed description of non-limiting exemplary implementations thereof, and from examining the appended drawing, in which.

DETAILED DESCRIPTION

Figure 1:
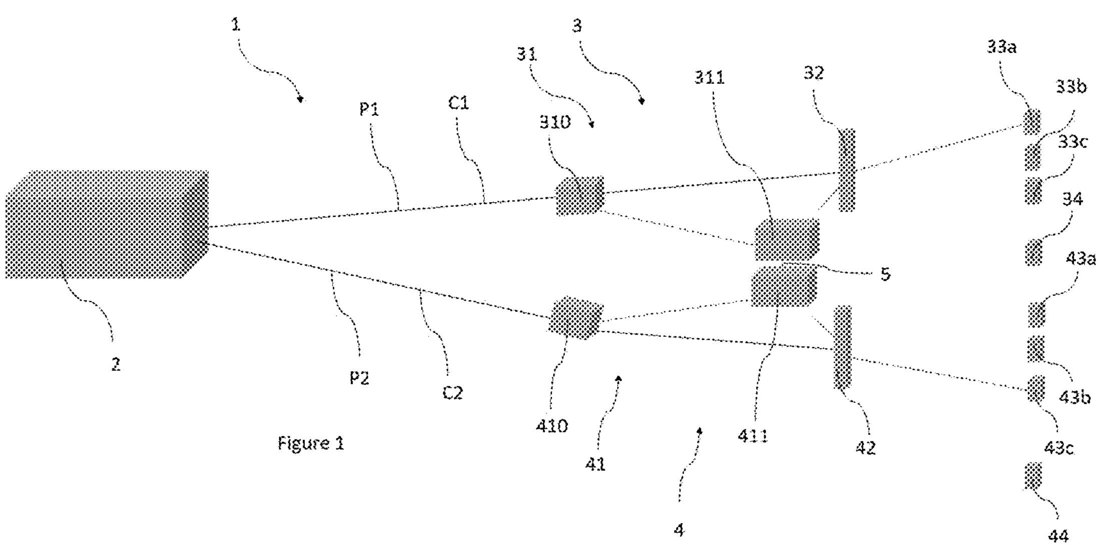
FIG. 1 schematically and partially depicts a system for making available EPR quantum channels according to the invention, FIG. 2 schematically and partially depicts another system for making available EPR quantum channels according to the invention, FIG. 3A schematically and partially depicts one example of a CNOT gate adapted to linearly polarized photons, FIG. 3B schematically and partially depicts one example of a CNOT gate adapted to circularly polarized photons, FIG. 3C schematically and partially depicts one example of a CNOT gate between two non-synchronized photons having wavelengths close to 780 nm, FIG. 3D schematically and partially depicts one example of storing a qubit carried by a photon in a rubidium atom, FIG. 3E schematically and partially depicts one example of extraction of a qubit carried by a rubidium atom to a photon, FIG. 4 schematically and partially depicts a method for the teleportation of quantum information according to the invention, from a quantum memory consisting of a rubidium Rb atom located in a first receiver, to a second receiver, FIG. 5 schematically and partially depicts a method for the teleportation of quantum information according to the invention, to a quantum memory consisting of a neutral atom, FIG. 6 schematically and partially depicts a quantum information teleportation assembly according to the invention, FIG. 7 schematically and partially depicts a method for the parallel teleportation of nine qubits carried by physical qubit vectors, allowing the implementation of Shor's error correction algorithm during qubit transmission using the system of FIG. 1, FIG. 8 schematically and partially depicts a method for generating entangled photons according to their polarization, FIG. 9 schematically and partially depicts a method for measuring a result of the teleportation of quantum information, FIG. 10 schematically and partially depicts the transfer of a database stored in a memory of a computer to a quantum memory of the same computer, and FIG. 11 schematically and partially depicts an optical cavity with an interchangeable atom.

FIG. 1 illustrates a system 1 for making available EPR quantum channels according to the invention. The system comprises an emitter 2 emitting a pair of entangled photons (P1, P2), the first photon P1 propagating on a propagation path C1 and the second photon C2 propagating on a propagation path C2 different from the path C1.

Due to the nature of light and the wave-particle duality of the photon, the terms "wave", "electromagnetic wave", "photon" and "particle" are used indiscriminately below to designate the product emitted by the emitter 2.

The system 1 comprises a first receiver 3, located on the propagation path C1 of the first photon P1, and a second receiver 4, located on the propagation path C2 of the second photon P2. The photons P1 and P2 are preferably emitted simultaneously and the paths C1 and C2 are preferably of the same length, that is to say the photons P1 and P2 emitted by the emitter 2 arrive entangled, preferably simultaneously, at the receivers 3 and 4.

In the example under consideration, the receiver 3 comprises a photon passage detector 31, a photon switch 32, photon storage units 33*a* to 33*c*, and a photon evacuation channel 34.

The receiver 4 comprises a photon passage detector 41, a photon switch 42, photon storage units 43*a* to 43*c*, and a photon evacuation channel 44.

The photon storage units 33*a* to 33*c* and 43*a* to 43*c* are for example optical fibers, preferably of the same length, in particular of a length between 1 mm and 200 m. The shorter the length of the optical fiber, the faster the photon reaches the user. The longer it is, the longer the time for which the user may be alerted of the arrival of the photon.

The photons P1 and P2 may be transmitted between the emitter and the first and second receivers, respectively, in various ways and in various media. The photons propagate for example in an optical fiber or a waveguide, or else in free space, the space being empty or filled with gas. The photons may pass through multiple media, having different refractive indices. For example, it is possible to insert anti-reflection plates between two media that are passed through, where applicable, in order to avoid unwanted optical phenomena, in particular Fresnel reflection of the waves emitted by the emitter 2.

Optical correction devices, not shown, may advantageously be positioned upstream of the photon passage detectors 31 and 41. The optical correction devices are preferably designed to correct the distortions that the photons have undergone between the emitter 2 and said optical correction devices. Indeed, the photons may have undergone transformations with regard to their polarization, but also with regard to their shape during their journey on the paths C1 and C2. The optical correction devices advantageously have photon shape and phase detectors, which are used in particular on photons that said detectors may absorb and that are therefore not transmitted to the photon passage detectors 31 or 41. The photon shape and phase detectors operate intermittently, for example, on incident photon samples.

The wavelength of the emitted wave is chosen for example according to the one or more media to be passed through; photons in the infrared range will preferably be used, for example, when these have to travel through the atmosphere or through the air.

For example, the emitter 2 generates pairs of entangled photons using the spontaneous parametric down-conversion (SPDC) method. As an alternative, the emitter 2 may generate pairs of entangled photons via a CNOT gate into which two photons that have passed through an optical Hadamard gate are injected. The emitter 2 is for example configured to emit on average at least one pair per unit of time, for example every nanosecond, this corresponding to a photon transmission frequency of 1 GHz.

The photons P1 and P2 are entangled according to their polarization. As a variant, the photons P1 and P2 may be entangled according to their wavelength, as described in the Article by C. Bernhard, B. Bessire, T. Feurer, A. Stefanov, 2013, Shaping frequency entangled qubits, Physical Review A. 88. The photons P1 and P2 may also be entangled in time (referred to as "time-bin" entangled photons).

When they are emitted, the photons P1 and P2 are for example rectilinearly polarized, that is to say the corresponding electromagnetic wave has an electric field whose direction is perpendicular to their direction of propagation C1 or C2. The polarization direction is preferably fixed, for example horizontal, so as to allow the devices 30 and 40 to detect and modify the disturbances applied to said polarization during the journey of the photons from the emitter 2.

The quantum state corresponding to the polarization of the photons is sometimes undetermined until it has been measured or absorbed. Before being measured, the quantum state of the photon is therefore sometimes considered to be the superposition of possible states, namely, in the example under consideration, to be the superposition of a polarization at an angle of 45° and a polarization at an angle of −45°.

As a variant, the emitted photons P1 and P2 are circularly polarized, that is to say the direction of the corresponding electric field changes according to a rotational movement, while its norm remains constant.

In the example under consideration, the photon switch 32 or 42 is configured to send the photon P1 or P2 received by the receiver 3 or 4 to a photon storage unit 33*a*, 33*b* or 33*c*, or 43*a*, 43*b* or 43*c*, the number of photon storage units per receiver not being limited, said storage unit being chosen by the controller 310 or 410.

The storage units 33*a* to 33*c* or 43*a* to 43*c* are configured to store the photon P1 or P2, while waiting for said photon to be delivered to the one or more users.

The evacuation channel 34 or 44 is configured to evacuate the photon P1 or P2 received by the receiver from said receiver when its entangled photon P2 or P1 has not been received by the other receiver.

Each photon passage detector 31 and 41 comprises a control unit 310 and 410, respectively, and a communication unit 311 and 411, respectively.

The photon passage detector 31 or 41 detects the passage of the photon P1 or P2, respectively, and communicates this information to the control units 310 or 410, respectively.

The control units 310 and 410 each have a clock, not shown, said clocks preferably being synchronized. The control units 310 and 410 communicate with one another via the communication units 311 and 411.

The two communication units 311 and 411 communicate with one another via a communication system 5, in particular so as to exchange the times of reception of the photons P1 and P2. Exchanging the times of reception of the photons allows each of the receivers 3 and 4 that has received a first photon to determine whether the other receiver has received the photon entangled with this first photon.

The communication system 5 is preferably a communication system as described in patent FR3125658 or, as an alternative, an optical communication system, in particular an optical fiber communication system, a radio communication system, or a power line communication system.

The control units 310 and 410 are in particular configured to control the photon switches 32 and 42. For example, the control units 310 and 410 are configured to control the current sent to the electroacoustic transducers of the photon switches 32 and 42, in order to modify the refractive index of the acousto-optic material and thus the direction of transmission of the photon.

The control unit 310 or 410 may be configured to command the photon switch 32 or 42 to send the photon to the photon evacuation channel 34 or 44, if the photon passage detector 31 or 41 receives information that the other receiver has not received the photon entangled with said photon.

Figure 2:
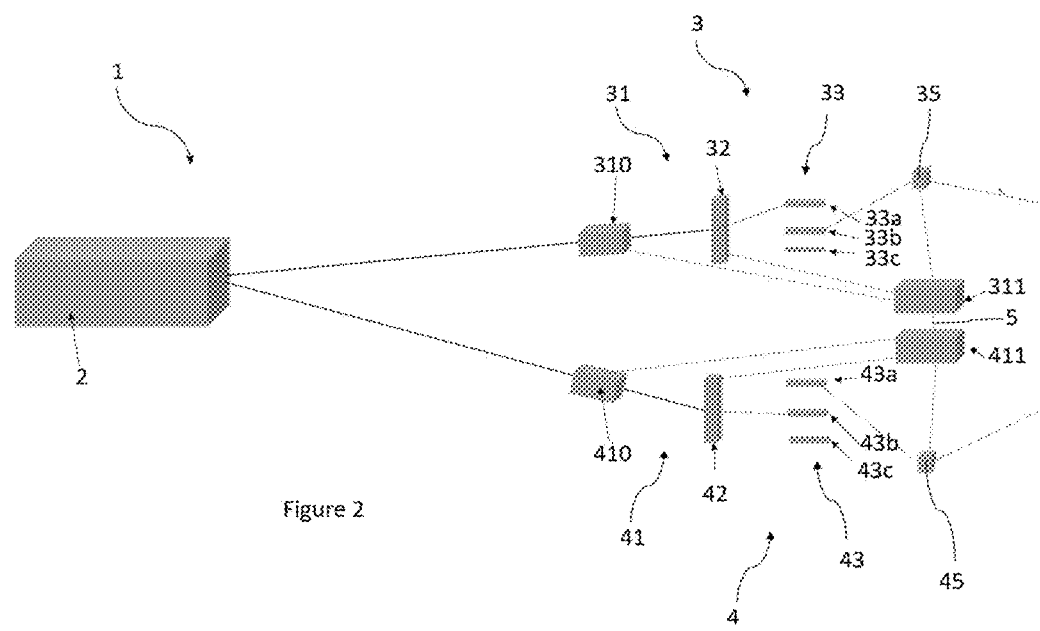

As a variant, as illustrated in FIG. 2, the control unit 310 or 410 may be configured to command the switch 32 or 42 to sequentially communicate the qubit carried by the photon P1 or P2 to the qubit vectors of a set 33 of qubit vectors grouping together the qubit vectors 33*a*, 33*b* and 33*c*, or to a set 43 of qubit vectors grouping together the qubit vectors 43*a*, 43*b* and 43*c*. The control unit 310 or 410 may then be configured to command systems, not shown, surrounding said qubit vectors, to carry out the procedure of transferring the qubit carried by the photon communicated to said qubit vector, to said qubit vector itself, for example as illustrated in FIG. 3D.

With the communication units 311 and 411 having communicated together, the control units 310 and 410 may then establish that a particular qubit carried by a particular qubit vector 33*a* to 33*c* and 43*a* to 43*c* is entangled with a qubit of the other receiver. The control units 310 and 410 may then indicate the availability of such qubits to the users.

Figure 3A:
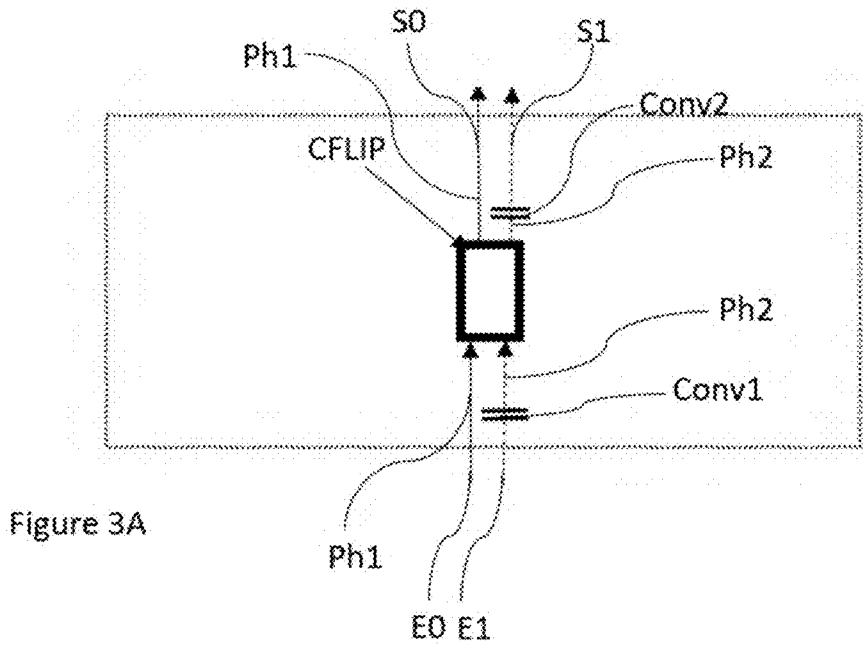
Figure 3B:
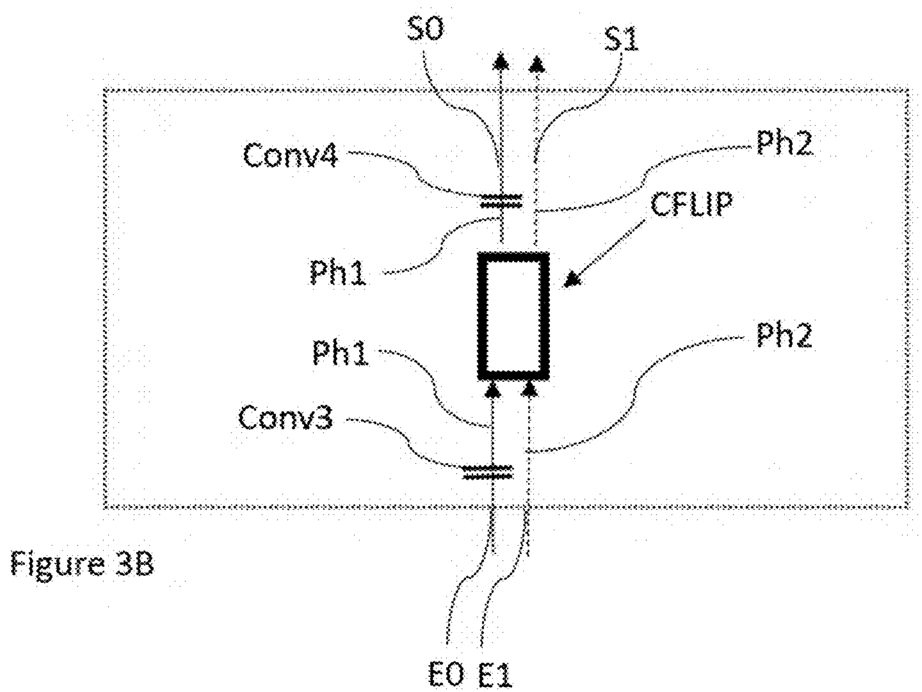
Figure 3C:
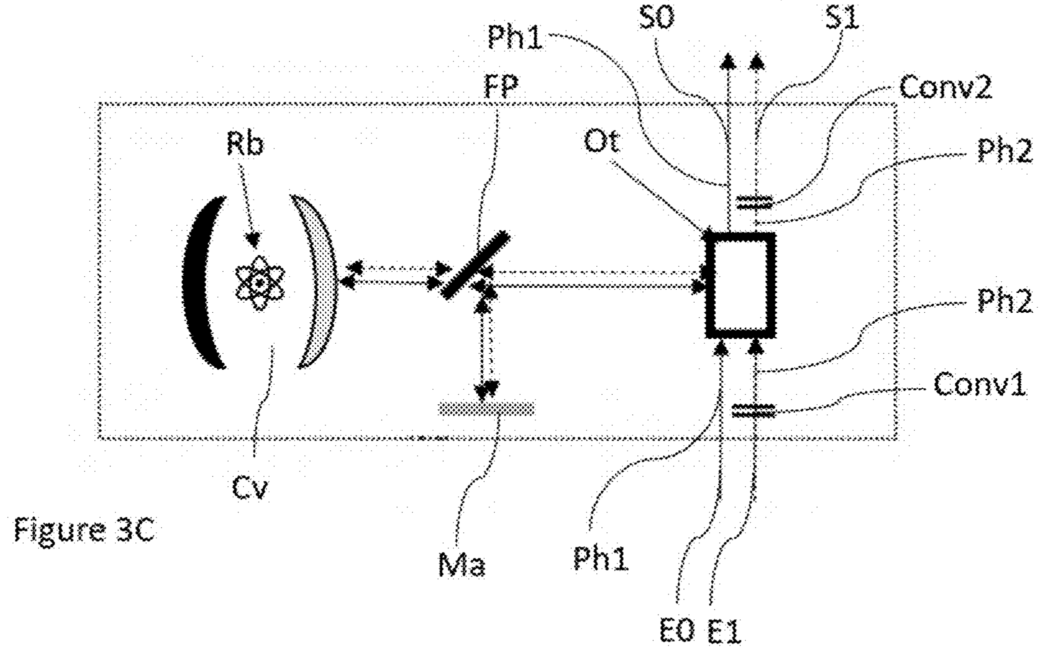
Figure 3D:
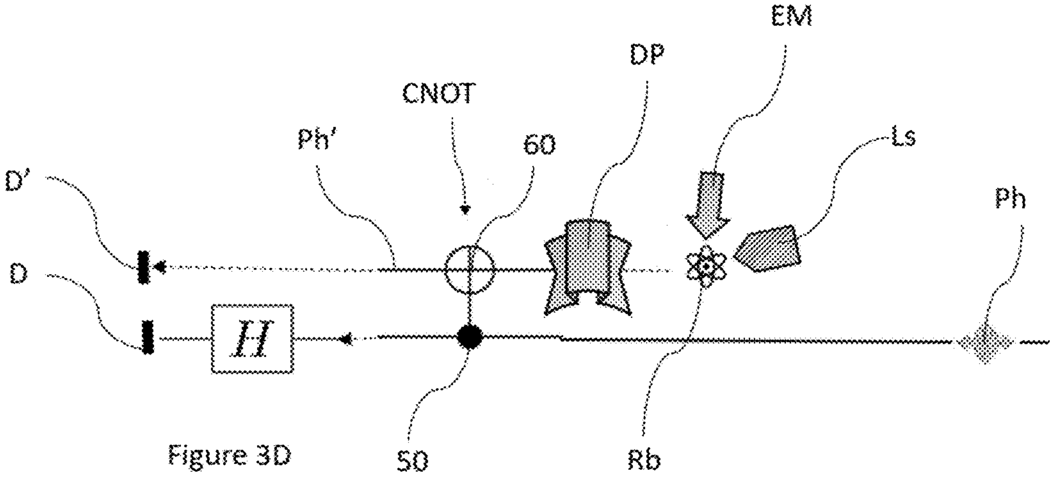
Figure 3E:
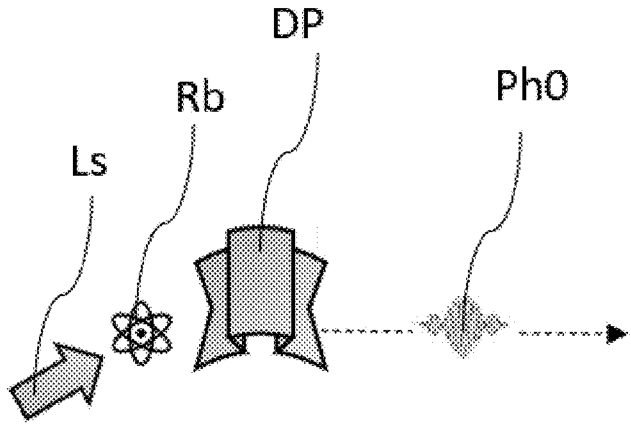

Controllers 35 and 45 may then, for example at the request of the users, extract qubits identified as having an entangled qubit at the other receiver, for example using the procedure indicated in FIG. 3E.

FIGS. 3A to 3C illustrate examples of CNOT gates.

FIG. 3A illustrates a CNOT gate adapted to linearly polarized photons, for qubits encoded on photons on a linear polarization base, transforming two qubits Qubit0 and Qubit1 into two other qubits Qubit2 and Qubit3, where Qubit2=Qubit0 and Qubit3=Qubit1 unless Qubit0=1, in which case Qubit3=0 if Qubit1=1 and Qubit3=1 if Qubit1=0.

A first incident photon Ph1, which is what is referred to as the control photon and is linearly polarized, enters via a control photon input E0 of a flip control gate CFLIP, in particular as described in the Article "A photon-photon quantum gate based on a single atom in an optical resonator" published by the Max Planck Institute in 2017.

A second photon Ph2 is transformed by a polarization converter Conv1 into a circularly polarized photon, in one direction if the photon Ph2 is horizontally polarized, or in the other direction if it is vertically polarized.

The control photon Ph1 exiting the gate CFLIP is sent to an output S0. The gate CFLIP allows the second photon Ph2 to exit in an unchanged circular polarization state if the photon Ph1 was vertically polarized, or circularly polarized in the other direction if the photon Ph1 was horizontally polarized.

The circularly polarized photon Ph2 is then converted into a linearly polarized photon by a converter Conv2.

FIG. 3B illustrates a CNOT gate adapted to circularly polarized photons, for qubits encoded on photons on a circular polarization base, transforming two qubits Qubit0 and Qubit1 into two other qubits Qubit2 and Qubit3, where Qubit2=Qubit0 and Qubit3=Qubit1 unless Qubit0=1, in which case Qubit3=0 if Qubit1=1 and Qubit3=1 if Qubit1=0.

A first incident photon Ph1, which is what is referred to as the control photon and is circularly polarized, is converted into a linearly polarized photon by a polarization converter Conv3, then passes through a control photon input of a flip control gate CFLIP.

The control photon Ph1 exiting the gate CFLIP is sent to the polarization converter Conv4, which converts it into a circularly polarized photon.

A second photon Ph2 is sent via a controlled input of the gate CFLIP, which it exits circularly polarized in the same direction, or in the opposite direction depending on the direction of polarization of the photon Ph1 that traveled through the gate CFLIP.

FIG. 3C illustrates a CNOT gate between two unsynchronized photons having wavelengths close to 780 nm, the photons carrying qubits encoded according to a linear polarization (said CNOT gate illustrated in FIG. 3C being inspired by the Article "Scalable Photonic Quantum Computation through Cavity-Assisted Interactions" published in March 2004 in Physical Review Letter).

The first photon Ph1, which is what is referred to as the control photon and is linearly polarized, enters the CNOT gate at E0. It is directed, by an orientator Ot, to a polarizing filter FP, which sends it to a mirror Ma if it is vertically polarized, or to a cavity Cv containing a rubidium atom Rb if it is horizontally polarized.

An electromagnetic pulse is applied to the atom Rb so that its quantum state changes by $\pi/2$.

The photon Ph1 reflected by the mirror Ma or by the cavity Cv is then returned by the polarizing filter FP to the orientator Ot, which directs it to an output S0.

The second photon Ph2 enters the CNOT gate at E1. Its polarization is transformed by a polarization converter Conv1 into circular polarization, in one direction if the photon Ph2 is horizontally polarized, or in the other direction if it is vertically polarized.

The orientator Ot sends the circularly polarized photon Ph2 to the polarizing filter FP, which reflects the vertical component of the polarization without a phase change but reflects the horizontal component with a phase shift of $\pi$, causing the circular polarization of the photon Ph2 to change direction.

The circularly polarized photon Ph2 is then converted into a linearly polarized photon by a converter Conv2.

The distances between the polarizing filter FP and the mirror Ma and between the polarizing filter FP and the cavity Cv are adjusted such that the optical path of the photons Ph1 and Ph2 is the same when returning to the orientator Ot regardless of where they are reflected, the mirror Ma or the cavity Cv.

The polarization converters Conv1 and Conv2 are for example quarter-wave plates matched to the wavelength of the photon Ph2, or quarter-wave plates interposed between two outputs of two multiplexers associated with one and the same wavelength, and matched to said same wavelength.

The orientator Ot may consist of electrically controlled elements such as liquid crystals or Pockels cells, so as to be able to control the trajectory of the photons according to the date of their passage.

Since the wavelengths of the two photons Ph1 and Ph2 may be different, the orientator Ot may also comprise dichroic materials and/or filters.

FIG. 3D illustrates a method for the quantum storage, on a rubidium 87 atom Rb, of a qubit carried by a photon. An incident photon Ph carrying a qubit is sent to the control port 50 of a CNOT gate and then to a Hadamard gate H at the output of the CNOT gate. After the photon Ph passes through the CNOT gate, the atom Rb is excited by optical pumping by a laser Ls until a photon passage detector DP detects the passage of a photon. Said photon is then directed to the controlled port 60 of the CNOT gate. A Bell measurement is then carried out on the incident photon Ph and the controlled photon Ph' by the polarization detectors D and D'. One or more microwave electromagnetic pulses EM are then sent by an antenna 4 to the atom Rb so as to subject it to a quantum gate. Said quantum gate is characterized as follows:

- If D=0 and D'=0, the quantum gate is identity,
- If D=0 and D'=1, the quantum gate is a NOT gate,
- If D=1 and D'=0, the quantum gate is a Pauli-Z gate,
- If D=1 and D'=1, the quantum gate is a NOT gate followed by a Pauli-Z gate.

FIG. 3E illustrates a method for extracting a qubit carried by a rubidium 87 atom Rb on a photon. The atom Rb is a quantum memory encoding qubits on its states. The atom Rb is excited by optical pumping by a laser Ls until the photon passage detector DP detects a photon Ph0. Said photon Ph0 is emitted at a wavelength of 780 nm and is entangled with the atom Rb with a linear polarization. The state of the atom Rb may be measured, possibly preceded by the application of a Hadamard gate to said atom, at the request of the user, and the result communicated to said user.

Figure 4:
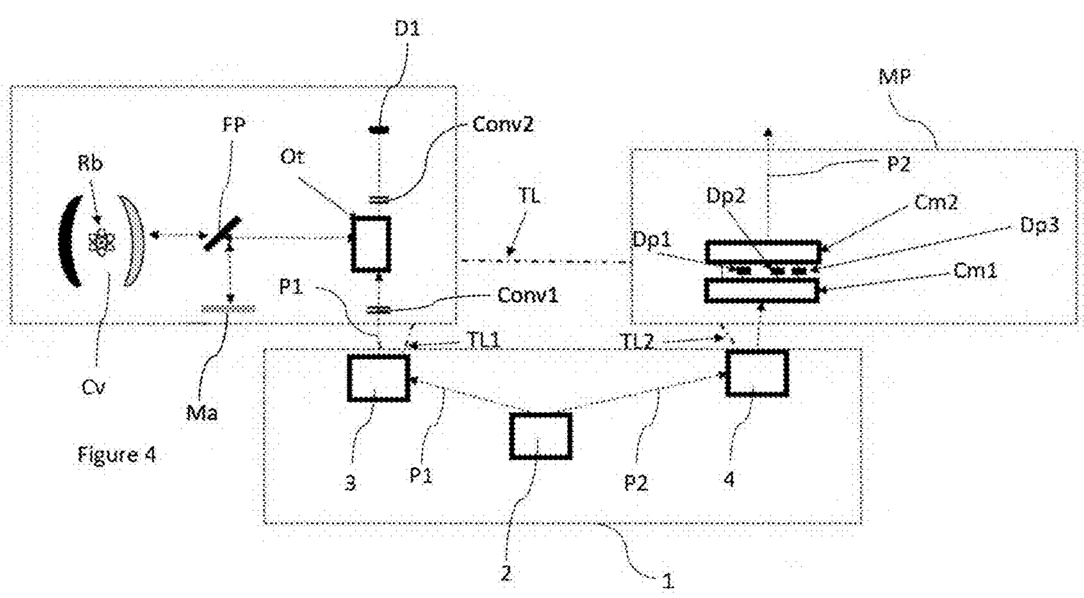

FIG. 4 illustrates a method for making available an EPR quantum channel according to the invention, using the system 1, and illustrates more particularly the long-distance teleportation of a qubit from a quantum memory consisting of a rubidium atom Rb located in the receiver 3 to a photon.

The rubidium atom is in a combination of the two Rydberg states F=1; mF=1 and F=2; mF=2, respectively representing associated low and high states of the atom on which a qubit is encoded.

The system 1 for making available an EPR quantum channel sends, from its receiver 3, a first photon P1 of wavelength 780 nm encoding a qubit according to a linear polarization base, entangled with another photon P2 on the path to the receiver 4. The receiver 3 signals the arrival of the photon P1 to an orientator Ot.

The photon P1 passes through a polarization converter Conv1, which transforms a linear polarization of a photon into a circular polarization. The orientator Ot then directs the photon P1 to a polarizing filter FP, which sends it to a mirror Ma if it is vertically polarized, or to a cavity Cv containing the rubidium atom Rb if it is horizontally polarized.

The photon P1 reflected by the mirror Ma or by the cavity Cv is then returned by the polarizing filter FP to the orientator Ot, which directs it to a polarization converter Conv2, which transforms a circular polarization of a photon into a linear polarization.

One or more electromagnetic-wave pulses in the microwave range are sent to the rubidium atom, thus subjecting it to a Hadamard Gate.

Next, the excitation state of the rubidium atom Rb is measured and the polarization of the photon is measured by a photon detector D1. These measurements are communicated to the receiver 4, either by a direct communication line TL or by a first line TL1, and then the system 1 for making available EPR quantum channels, and then a second line TL2.

Depending on the measurements of the states of the rubidium atom Rb and of the direction of the polarization of the photon P1, that is to say the state 0 or 1 of the qubit carried by each of them, the polarization modifier MP actuates two switches Cm1 and Cm2 before the photon P2 from the second receiver 4 reaches them, causing the photon P2 to pass through combinations of devices Dp1, Dp2 and Dp3, allowing operations to be performed on the photon P2.

If the measurement of the qubit carried by the rubidium atom is 0 and that of the qubit carried by the photon P1 is 0, that is to say if it has a vertical polarization, the photon P2 does not undergo any operation.

If the measurement of the qubit carried by the rubidium atom is 0 and that of the qubit carried by the photon P1 is 1, that is to say if it has a horizontal polarization, the photon P2 is sent through a Pauli-Z gate.

If the measurement of the qubit carried by the rubidium atom is 1 and that of the qubit carried by the photon P1 is 0, that is to say if it has a horizontal polarization, the photon P2 is sent through a NOT gate.

If the measurement of the qubit carried by the rubidium atom is 1 and that of the qubit carried by the photon P1 is 1, that is to say if it has a horizontal polarization, the photon P2 is sent through a NOT gate followed by a Pauli-Z gate.

The NOT gate consists for example of two birefringent prisms and two half-wave plates. The Pauli-Z gate consists for example of a half-wave plate.

Figure 5:
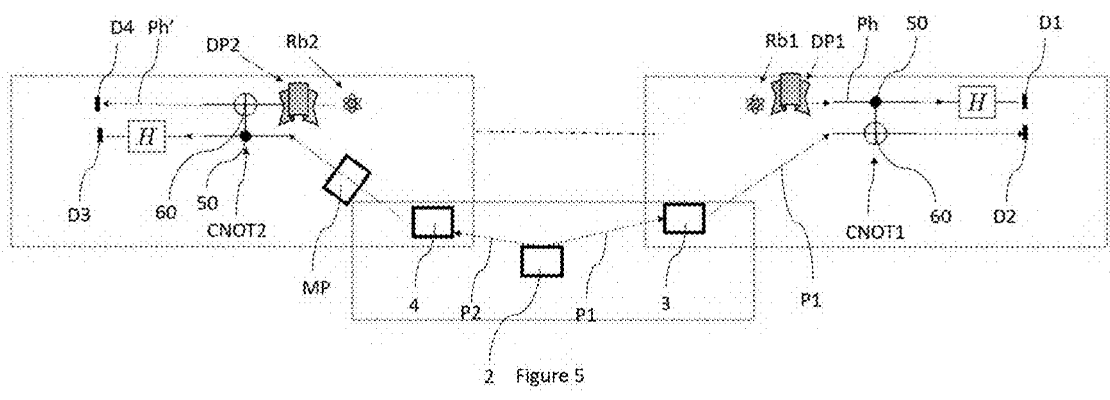

FIG. 5 illustrates a method for making available an EPR quantum channel according to the invention, using the system 1, and illustrates more particularly a method for the teleportation of quantum information to a quantum memory consisting of a neutral atom, using the system 1.

A first rubidium atom Rb1 is excited until a photon passage detector DP1 detects an emitted photon Ph and directs it to the control port 50 of a first control gate CNOT1 as described above before sending it to a Hadamard gate H, and then its polarization direction is measured by a photon detector D1.

The receiver 3 of the system 1 sends a first photon P1 of wavelength 780 nm to the controlled port 60 of the gate CNOT1, which modifies it, and then the direction of the linear polarization of said photon P1 is measured by the photon detector D2.

The receiver 4 of the system 1 sends a second photon P2, entangled with the first photon P1, to a phase modifier MP, which, depending on the measurements of the detectors D1 and D2, changes the polarization of said second photon in the manner described above.

The second photon P2 is then directed to the control port 50 of a second gate CNOT2 operating at a wavelength of 780 nm as described above, before passing through a Hadamard gate H and having the direction of its polarization measured by a photon detector D3.

A second atom Rb2 is excited until a second passage detector DP2 detects the passage of a photon Ph', which is then directed to the controlled port 60 of the second gate CNOT2 before having the direction of its linear polarization measured by a photon detector D4.

One or more microwave electromagnetic pulses are sent to the second atom Rb2 so as to subject it to a unitary quantum gate characterized as follows:

If D3=0 and D4=0, the unitary quantum gate is identity,

If D3=0 and D4=1, the unitary quantum gate is a Pauli-Z gate,

If D3=1 and D4=0, the unitary quantum gate is a NOT gate,

If D3=1 and D4=1, the unitary quantum gate is a NOT gate followed by a Pauli-Z gate, As an alternative, the entangled photons emitted by the photon emitter 2 are of a wavelength other than 780 nm and are converted to 780 nm photons, before they arrive at the photon receivers 3 and 4, by a frequency mixer, as described for example in the Article "Entanglement between a trapped ion qubit and a 780-nm photon via quantum frequency conversion" published on Oct. 26, 2022 in Physics review.

Figure 6:
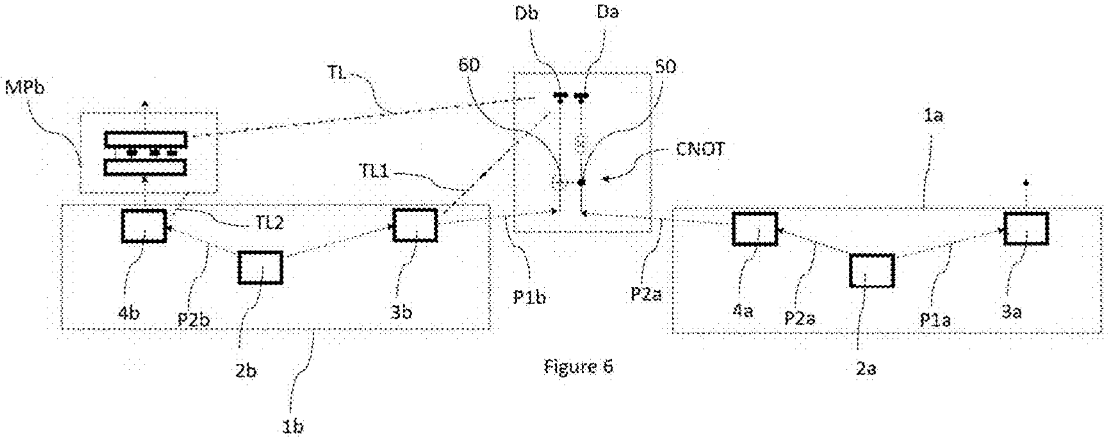

There may be multiple systems 1 for making available EPR quantum channels in succession in order to form a quantum information teleportation assembly, making it possible to transport qubits over very large distances, for example over 1000 km, using optical fibers. FIG. 6 illustrates such an assembly for making available EPR quantum channels, comprising two systems 1*a* and 1*b* for making available EPR quantum channels.

A first system for making available EPR quantum channels makes two entangled photons P1*a* and P2*a* available to receivers 3*a* and 4*a*.

The photon P2*a* is directed to the control port 50 of a CNOT gate as described above, operating for example in a linear polarization base.

Said photon P2*a* exits the CNOT gate so as to pass through a Hadamard gate H before having the direction of its polarization measured by a photon detector Da.

The controlled port 60 of the CNOT gate is supplied with a third photon P1*b* from the receiver 3*b*, this photon itself being entangled with a fourth photon P2*b* exiting the receiver 4*b* and made available by a second system 1*b* for making available EPR quantum channels.

The third photon P2*b* is modified in the CNOT gate before having the direction of its polarization measured by a photon detector Db.

The results of the measurement are communicated to a polarization modifier MPb, either via a direct data transmission line TL, or via the transmission line TL1, the second system 1*b* and the transmission line TL2.

The fourth photon P2*b* exits the receiver 4*b* so as to go to the polarization modifier MPb. Depending on the measurements of the polarization directions at Da and Db, and therefore the state 0 or 1 of each of the qubits carried by the photons P2*a* and P1*b*, the polarization modifier MPb actuates two switches Cm1 and Cm2 before the photon P2*b* from the second receiver 4*b* reaches them, causing the photon P2*b* to pass through combinations of devices Dp1, Dp2, Dp3, allowing operations to be performed on the photon P2*b*.

If the measurement P2*a* is 0 and that of P1*b* is 0, the photon P2*b* does not undergo any operation.

If the measurement P2*a* is 0 and that of P1*b* is 1, the photon P2*b* is sent through a Pauli-Z gate.

If the measurement P2*a* is 1 and that of P1*b* is 0, the photon P2*b* is sent through a CNOT gate.

If the measurement P2*a* is 1 and that of P1*b* is 1, the photon P2*b* is sent through a CNOT gate and then through a Pauli-Z gate.

The system formed in this way therefore makes two entangled photons P1*a* and P2*b* available to the users of the receiver 3*a* and at the output of the polarization modifier MPb.

More than two systems for making available EPR quantum channels according to the invention may be linked one after the other so as to form a quantum transmission chain that makes available to users, at each of its ends, photons entangled with photons that have reached the other end of said chain.

Figure 7:
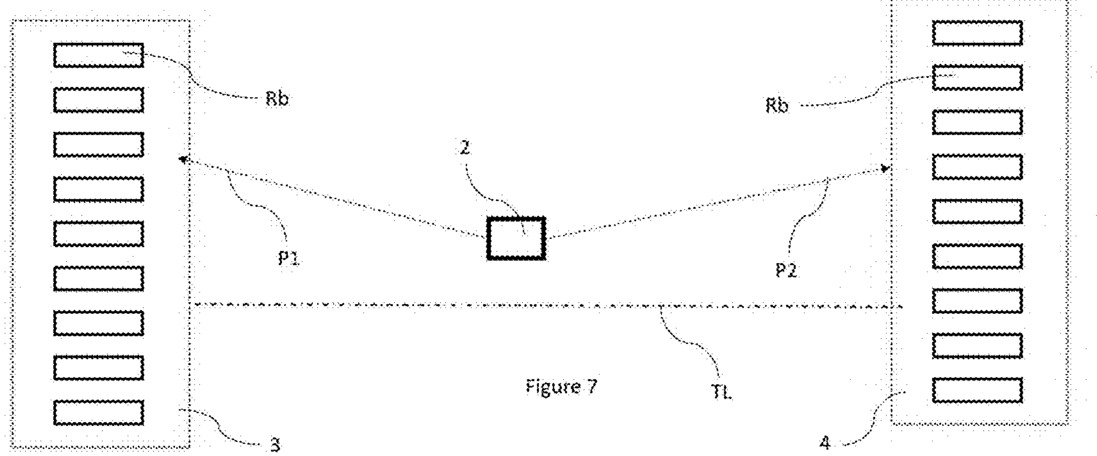

FIG. 7 shows the entangled-photon emitter 2 sending pairs of entangled photons P1 and P2 to the receivers 3 and 4, the latter also having a direct transmission line TL allowing them to exchange conventional information.

Each receiver 3 and 4 contains for example nine rubidium-87 atoms Rb designed to be able to emit photons and be subjected to unitary quantum gates.

Each of the atoms Rb of a receiver 3 or 4 is paired with an atom Rb of the other receiver 4 or 3.

An optical switch, not shown, present at each of the receivers 3 and 4, makes it possible to direct the photons emitted by any of the atoms Rb of the receiver to a single photon passage detector, not shown, upstream of the single CNOT gate, not shown, arranged in each of the two receivers.

Said optical switches of the two receivers 3 and 4 are actuated simultaneously so as, within each receiver, to send the photons emitted by one of the atoms Rb to the photon passage detector until said atom Rb has been entangled with the atom Rb with which it is paired in the other receiver.

Once each of the nine pairs of atoms Rb has been entangled, an error reduction algorithm, for example Shor's algorithm, may be applied, the two receivers 3 and 4 being able to use the same conventional information transmission means TL as that used by the communication system.

Figure 8:
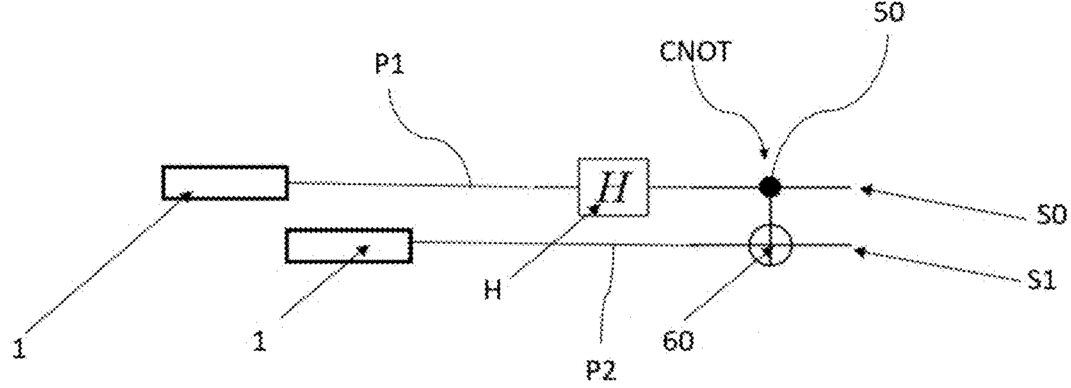

FIG. 8 illustrates a method for generating entangled photons. An emitter 2 of vertically linearly polarized photons is stimulated to emit a first photon P1. This first photon P1 passes through a Hadamard gate H, such as a half-wave plate, before arriving at the input of a CNOT gate as described above, as a control photon.

A second vertically linearly polarized photon P2 is emitted by the photon emitter 2, said second photon P2 being directed to the controlled port 60 of the CNOT gate.

The photons P1 and P2 exiting at S0 and S1 are entangled and may be used as entangled photons in the system 1.

Figure 9:
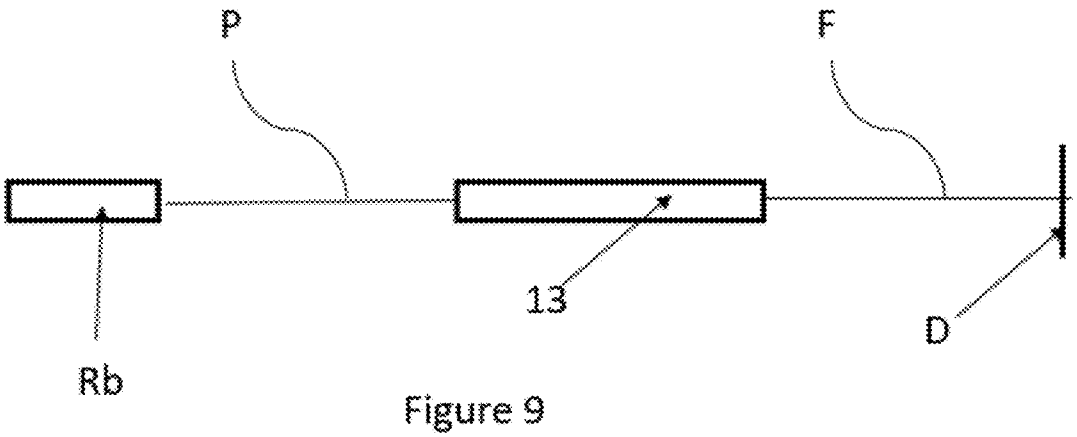

FIG. 9 illustrates a method for measuring the result of the teleportation of quantum information. The method makes it possible to instantaneously measure the probability of the qubit carried by a photon being read in a state 0 or 1. A particle, for example a rubidium-87 atom Rb or a ytterbium ion, to which for example a qubit has been teleported, is stimulated in order to emit a photon P that is entangled therewith. Said photon P is multiplied by an optical amplifier 13 that preserves its polarization, for example an erbium-doped fiber amplifier, so as to form a photon flux F. The polarization of the photon flux F is measured by a conventional polarization detector D as described above.

For example, a horizontal polarization denotes that the qubit carried by the particle was in the state 0, whereas a vertical polarization denotes that it was in the state 1, and an intermediate polarization denotes that the qubit was in an indeterminate state.

Figure 10:
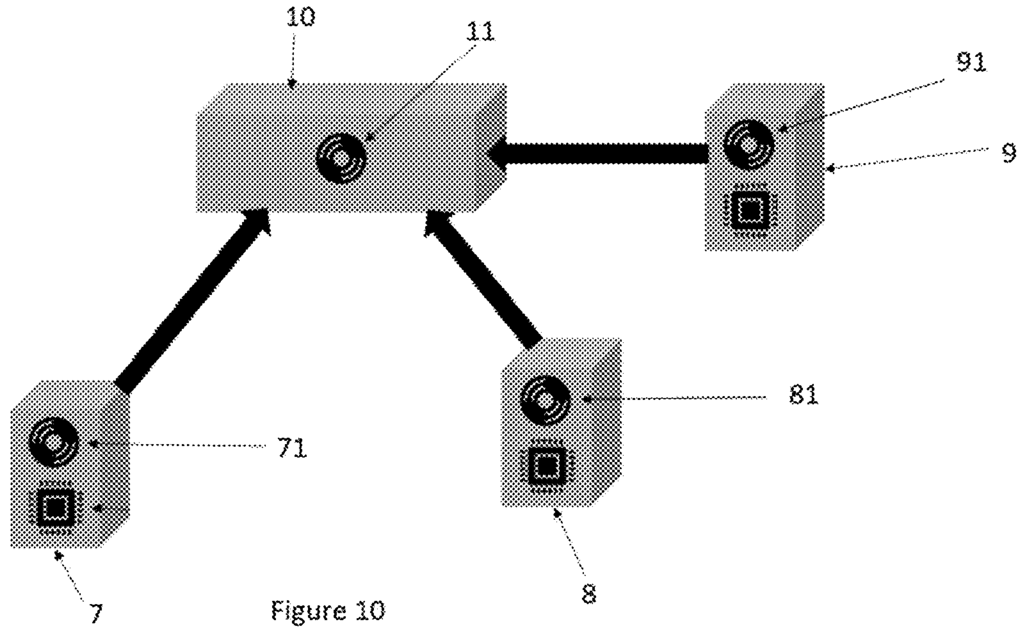

FIG. 10 illustrates the transfer of a conventional database, in which the conventional data are distributed over 3 separate computers 7, 8 and 9, to a quantum computer 10.

The computers 7, 8 and 9 respectively transfer their conventional data to a respective quantum memory 71, 81 and 91, and then the quantum memories of the quantum computers 7, 8 and 9 are transferred by a quantum information teleportation method according to the invention, to qubit vectors forming a quantum memory 11 of the quantum computer 10.

The quantum computer 10 may then interrogate the database reconstructed in its quantum memory 11.

Figure 11:
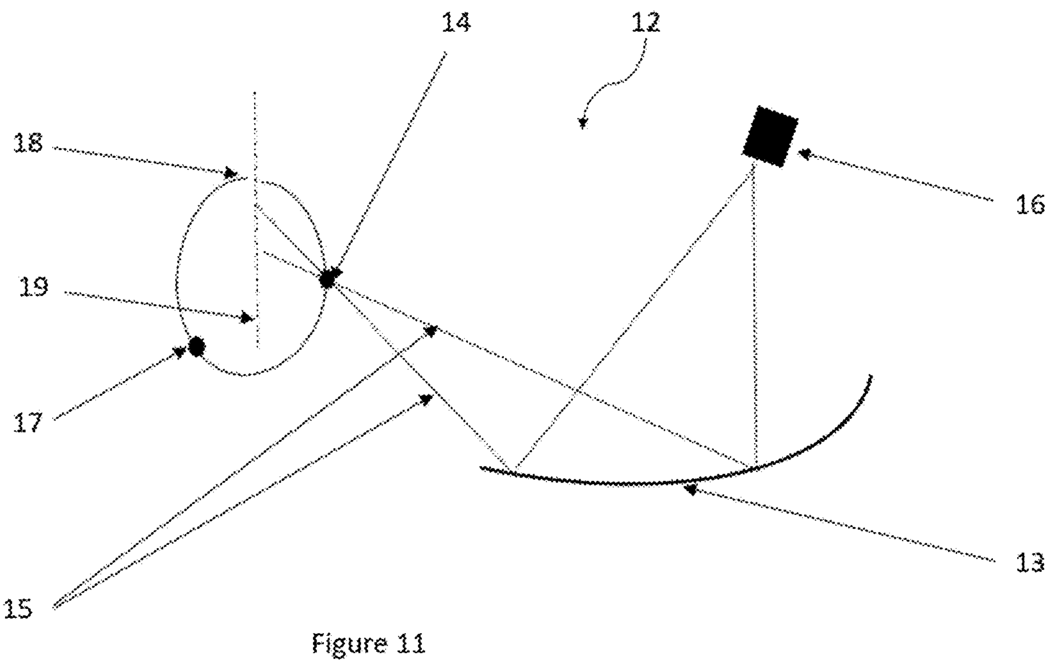

The photon switch 32 or 42 may be an optical microresonator 12, that is to say a cavity formed of an optical medium surrounded by reflective surfaces 13, in particular configured to serve as an optical CNOT gate, as illustrated in FIG. 11. Atoms that have to interact with each photon are successively introduced into the cavity. At least two holes 14 are formed in the cavity so as to let through at least two light rays 15 emitted by a laser 16 and serving as optical tweezers, the optical tweezers allowing the atom to be introduced into and positioned within the cavity. The use of optical tweezers in particular allows an atom to be displaced after it has interacted with the first of two photons to perform a CNOT operation. The atom may in particular be displaced to another cavity and replaced by a new atom, this making it possible to receive a new photon carrying a qubit used as a control qubit of another optical CNOT gate. The cavity comprises in particular a hole 17 allowing the passage of the incident photon carrying the qubit. The cavity also comprises an entrance/exit 18 for the atoms and photons emitted by the atoms in the cavity, the atoms moving along an axis 19.

The invention claimed is:

1. A system for making available an EPR quantum channel, comprising:

an entangled-photon emitter comprising a source configured to generate at least one pair of entangled photons comprising a first photon emitted on a first propagation path and, simultaneously, a second photon emitted on a second propagation path different from the first propagation path, a first receiver positioned on the first propagation path, comprising:

at least one qubit storage unit designed to store the qubit carried by the photon received by the first receiver, a photon switch designed to send the photon received by the first receiver to said storage unit, a photon passage detector configured to control the photon switch and record the time of reception of the photon by the first receiver, a second receiver positioned on the second propagation path so as to be reached by the second photon, said second receiver comprising:

at least one qubit storage unit designed to store the qubit carried by the photon received by the second receiver, a photon switch designed to send the photon received by the second receiver to said storage unit, a photon passage detector configured to control the photon switch and record the time of reception of the photon by the second receiver, at least one information processor contained in the first and/or second receiver designed to control the photon switch of the first and/or second receiver, a communication system linking the two receivers together, said communication system being designed in particular to communicate, to said information processor, the times of reception of the photons at the first and second receiver, in order to determine the pairs of entangled photons whose two photons have each reached the receiver to which they were sent.

2. The system as claimed in claim 1, a storage unit of the first and/or second receiver being chosen from among optical paths, in particular optical fibers or free-space passages formed using mirrors, or physical qubit vectors, in particular ions interacting indirectly with incident photons.

3. The system as claimed in either of claim 1, the duration for which each storage unit is capable of storing a qubit being greater than the time offset between the arrivals of the two entangled photons at the two receivers plus the time taken by the communication system to communicate information about the arrival times of the entangled photons, the time needed for the processors to decide whether two entangled qubits are present in one of the storage units of the receivers, and the time taken by the processors to inform interfaces of the receivers thereof.

4. The system as claimed in claim 1, the photon switch of the first receiver and/or second receiver being an optical microresonator, that is to say a cavity formed of an optical medium surrounded by reflective surfaces, into which atoms that are to interact with each photon are successively introduced, at least two holes in particular being formed in the cavity so as to let through at least two light rays serving as optical tweezers and allowing the atom to be introduced into and positioned within the cavity.

5. The system as claimed in claim 1, the photon passage detector of the first and/or second receiver comprising a non-destructive photonic qubit detector, for example using parametric conversion of the incoming photon, which produces two photons of smaller frequencies from a single photon, where one of the photons produced announces the presence of a qubit and the other provides information about said qubit.

6. The system as claimed in claim 1, the photon passage detector of the first and/or second receiver comprising a non-destructive photonic qubit detector, the non-destructive photonic qubit detector comprising a QED cavity in which a rubidium atom is trapped.

7. A method for making available an EPR quantum channel using the system for making available an EPR quantum channel of claim 1, comprising the following steps:

(a) generating a pair of entangled photons from an emitter, the first photon of the pair being emitted to a first receiver and the second photon of the pair being emitted simultaneously to a second receiver, the first and second photons being entangled, (b) detecting, where applicable, the arrival of a photon by way of a photon passage detector at each of the receivers, (c) communicating the times of reception of the photons between the two photon passage detectors of the first and second receivers, If the communication between the two photon passage detectors is faster than the time taken by the photon received by said receiver to travel from the photon passage detector to the photon switch of this receiver, the method comprises:

(d) a single temporary storage unit of the receiver conveying the photon from the photon passage detector to the photon switch, If the photon passage detector that received the photon receives information that the other photon passage detector has received the photon entangled with said photon, the method comprises:

(d1) the photon switch sending the photon to a qubit vector outside the system,

If the photon passage detector that received the photon receives information that the other photon passage detector has not received the photon entangled with said photon, the method comprises:

(d2) the photon switch sending the photon to a photon evacuation channel,

If the communication between the two photon passage detectors is slower than the time taken by the photon received by said receiver to travel from the photon passage detector to the photon switch of this receiver, the method comprises:

(e) conveying the photon from the photon passage detector to the photon switch and the photon switch sending the photon to a qubit storage unit, If the photon passage detector that received the photon receives information that the other photon passage detector has received the photon entangled with said photon, the method comprises:

(e1) the switch sending the photon from the qubit storage unit to a qubit vector outside the system if the qubit storage unit is an optical device or, if the qubit storage unit is not an optical device, making the qubit contained in the qubit storage unit available to a user, said availability for example being announced to the user by the electronics of the receiver, If the photon passage detector that received the photon receives information that the other photon passage detector has not received the photon entangled with said photon, the method comprises:

(e2) the photon switch sending the photon from the optical qubit storage unit to a photon evacuation channel, or if the qubit storage unit is not an optical device, resetting the qubit storage unit so that it is ready to receive a new photon.

8. A quantum information teleportation assembly comprising at least two systems for making available EPR quantum channels as described in claim 1, chained one after the other, the assembly comprising at least one optical CNOT gate between each of the systems, a first photon exiting a first system for making available EPR quantum channels of the assembly being sent to the control port of said CNOT gate, a second photon exiting a second system for making available EPR quantum channels of the assembly, following the first system, being sent to the controlled port of said CNOT gate.

9. The assembly as claimed in claim 8, a Bell measurement being performed on the first and second photons at the output of said CNOT gate, the first photon passing through a Hadamard gate at the output of the CNOT gate before its Bell measurement is performed, the results of this measurement being sent to a set of unitary quantum gates at the output of the last system for making available EPR quantum channels of the chain.

10. The assembly as claimed in claim 9, the photon exiting the receiver of the last system for making available EPR quantum channels of the chain, said receiver not being connected to any other receiver of another system, being sent to a unitary gate, the unitary gate being the product of the unitary quantum gates obtained by each of the Bell measurements at the interface of each of the chained systems for making available EPR quantum channels.

11. The assembly as claimed in claim 8, the unitary quantum gate being such that:

If $D_1=0$ and $D_2=0$, the unitary quantum gate is identity,

If $D_1=0$ and $D_2=1$, the unitary quantum gate is a Pauli-Z gate,

If $D_1=1$ and $D_2=0$, the unitary quantum gate is a NOT gate,

If $D_1=1$ and $D_2=1$, the unitary quantum gate is a NOT gate followed by a Pauli-Z gate, $D_1$ being the measurement of the quantum state of the first photon exiting the CNOT gate via the port associated with the control photon and $D_2$ being the measurement of the quantum state of the second photon exiting the CNOT gate via the port associated with the controlled photon.

12. The assembly as claimed in claim 8, comprising between 1 and 10 systems for making available EPR quantum channels, chained one after the other, or comprising between 1 and 30 systems for making available EPR quantum channels, chained one after the other, if said systems benefit from an error correction system.

13. The assembly as claimed in claim 8, the CNOT gate comprising a cavity in which a neutral atom, in particular a rubidium atom, is trapped.

14. A method for the teleportation of quantum information using the quantum information teleportation assembly as defined in claim 8, comprising transmitting a qubit from a first receiver to a second receiver.

15. A method for the long-distance teleportation of a qubit carried by a neutral atom to a photon, using the system for making available a quantum channel described in claim 1, comprising the following steps:

generating a pair of entangled photons from an emitter, the first photon of the pair being emitted to a first receiver and the second photon of the pair being emitted, preferably simultaneously, to a second receiver, the first and second photons being entangled, the photons in particular having a wavelength of 780 nm, the first photon encoding a qubit, in particular according to a linear polarization base, sending the first photon received at the first receiver to a CNOT gate comprising a cavity in which the neutral atom is trapped, sending electromagnetic-wave pulses in the microwave range to the neutral atom, thus subjecting it to a Hadamard gate, measuring the excitation state of the neutral atom and measuring the polarization of the first photon at the output of the CNOT gate, communicating said measurements to the second receiver, depending on the measurements of the states of the neutral atom and of the direction of the polarization of the first photon, that is to say the state 0 or 1 of the qubit carried by each of them, modifying the polarization of the second photon.

16. A method for the long-distance teleportation of a qubit carried by a first neutral atom to a second neutral atom, using the system for making available a quantum channel described in claim 1, comprising the following steps:

a. generating a pair of entangled photons from an emitter, the first photon of the pair being emitted to a first receiver and the second photon of the pair being emitted, preferably simultaneously, to a second receiver, the first and second photons being entangled, the photons in particular having a wavelength of 780 nm, the first photon encoding a qubit, in particular according to a linear polarization base, b. exciting the first neutral atom, located at the first receiver, until it emits a photon, and directing the emitted photon to the control port of a first CNOT control gate before sending it to a first Hadamard gate, c. sending the first photon of the pair of entangled photons to the controlled port of the first CNOT gate, d. measuring the direction of the polarization of the photon emitted by the first neutral atom at the output of the Hadamard gate and the direction of the polarization of the first photon at the output of the CNOT gate, e. communicating said measurements to the second receiver, f. depending on the measurements of the states of the neutral atom and of the direction of the polarization of the first photon, that is to say the state 0 or 1 of the qubit carried by each of them, modifying the polarization of the second photon of the pair of entangled photons to the second one, g. sending the modified second photon to the control port of a second CNOT gate before sending it to a second Hadamard gate, h. exciting the second neutral atom, located at the second receiver, until it emits a photon, and directing the emitted photon to the controlled port of the second CNOT gate, i. measuring the direction of the polarization of the photon emitted by the second neutral atom at the output of the second CNOT gate and the direction of the polarization of the first photon at the output of the second Hadamard gate, j. sending at least one microwave electromagnetic pulse to the second neutral atom so as to subject it to a unitary quantum gate, characterized in particular as follows:

i. if the measurement of the direction of the polarization of the photon emitted by the second neutral atom is 0 and that of the polarization of the second photon is 0, the second neutral atom does not undergo any operation, for example, ii. if the measurement of the direction of the polarization of the photon emitted by the second neutral atom is 1 and that of the polarization of the second photon is 0, the second neutral atom may be subjected to a Pauli-Z gate, iii. if the measurement of the direction of the polarization of the photon emitted by the second neutral atom is 0 and that of the polarization of the second photon is 1, the second neutral atom may be subjected to a NOT gate, iv. if the measurement of the direction of the polarization of the photon emitted by the second neutral atom is 1 and that of the polarization of the second photon is 1, the second neutral atom may be subjected to a NOT gate followed by a Pauli-Z gate.

17. A method for the teleportation of qubits carried by physical qubit vectors, in parallel, allowing the implementation of an error correction algorithm during qubit transmission, the method using the system for making available EPR quantum channels described in claim 1, the method comprising:

a. emitting pairs of entangled photons, the first photon of each pair being emitted to a first receiver and the second photon of each pair being emitted, preferably simultaneously, to a second receiver, each receiver containing at least one neutral atom, for example nine neutral atoms, the one or more neutral atoms being designed to be able to emit photons and be subjected to unitary quantum gates, each of the neutral atoms of one receiver being paired with a neutral atom of the other receiver, b. simultaneously, at each receiver, sending photons emitted by one of the neutral atoms of said receiver to a single photon passage detector of said receiver, the single photon passage detector being located upstream of a single CNOT gate of said receiver, until said neutral atom of said receiver has been entangled with the neutral atom with which it is paired in the other receiver, c. once each pair of neutral atoms has been entangled, applying an error reduction algorithm, for example Shor's algorithm.

* * * * *